United States Patent
Jha et al.

(10) Patent No.: US 10,331,358 B1
(45) Date of Patent: Jun. 25, 2019

(54) HIGH PERFORMANCE AND LOW-LATENCY REPLICATION USING STORAGE MIRRORING

(71) Applicant: Vexata, Inc., Santa Clara, CA (US)

(72) Inventors: Shailendra Jha, Folsom, CA (US); Satsheel Altekar, San Jose, CA (US)

(73) Assignee: VEXATA, INC., Santa Clara, CA (US)

( * ) Notice: Subject to any disclaimer, the term of this patent is extended or adjusted under 35 U.S.C. 154(b) by 302 days.

(21) Appl. No.: 15/421,122

(22) Filed: Jan. 31, 2017

(51) Int. Cl.
| | | |
|---|---|---|
| G06F 13/00 | (2006.01) | |
| G06F 15/167 | (2006.01) | |
| G06F 3/06 | (2006.01) | |
| H04L 29/08 | (2006.01) | |
| G06F 11/20 | (2006.01) | |
| G06F 11/14 | (2006.01) | |

(52) U.S. Cl.
CPC ............ *G06F 3/0611* (2013.01); *G06F 3/065* (2013.01); *G06F 3/067* (2013.01); *G06F 3/0659* (2013.01); *G06F 3/0683* (2013.01); *G06F 11/1458* (2013.01); *G06F 11/2076* (2013.01); *G06F 11/2089* (2013.01); *H04L 29/0854* (2013.01); *H04L 67/1095* (2013.01)

(58) Field of Classification Search
CPC . H04L 29/0854; H04L 67/10; H04L 67/1095; G06F 3/06; G06F 3/061–3/0614; G06F 11/1076; G06F 11/1448; G06F 11/1458–11/1469; G06F 11/2053; G06F 11/2076; G06F 11/2082; G06F 11/2089–11/2094; G06F 16/10
See application file for complete search history.

(56) References Cited

U.S. PATENT DOCUMENTS

| | | | | |
|---|---|---|---|---|
| 7,337,287 B2* | 2/2008 | Morimoto | ........... | G06F 11/1076 711/114 |
| 7,454,585 B2* | 11/2008 | Arimilli | ................ | G06F 9/3834 711/118 |
| 8,151,014 B2* | 4/2012 | Foster | ................. | G06F 11/1076 710/22 |
| 2013/0080700 A1* | 3/2013 | Yoshida | .............. | G06F 11/3034 711/114 |

\* cited by examiner

*Primary Examiner* — Brendan Y Higa
(74) *Attorney, Agent, or Firm* — Pillsbury Winthrop Shaw Pittman LLP

(57) ABSTRACT

An improved storage replication scheme removes the bottlenecks in the data replication path and allows for high performance replication, both synchronous and asynchronous. The scheme eliminates storage array controllers from the replication data path and provides an implementation of array based replication which can sustain much higher input/output (I/O) write bandwidth with much lower latency from the application's perspective.

20 Claims, 3 Drawing Sheets

HIGH PERFORMANCE AND LOW-LATENCY REPLICATION USING STORAGE MIRRORING

TECHNICAL FIELD

The present disclosure relates generally to improved storage system for data to achieve failover in a network.

BACKGROUND

In enterprise data systems, it is very important to prevent downtime. Such downtime may be caused by scheduled maintenance or unpredicted system or component failure, e.g., failure of one or more of a server, processor, network, storage, database etc. To prevent downtime, systems are designed with failover options, i.e. the ability to switch between a primary system component and a secondary system component.

Currently, storage replication, especially synchronous storage replication, is primarily used by applications which need instant failover. Replication is a managed service in which stored or archived data is duplicated in real time over a storage area network (SAN). Replication helps in maintaining continuity of data access in a network and also helps in disaster recovery.

Currently available synchronous implementations, such as, host/appliance or array based replication, are very slow and not suitable for applications which have very high write bandwidth requirements.

SUMMARY

The embodiments discussed here relate to a storage replication scheme which removes the bottlenecks in the replication path and allows for high performance replication, both synchronous and asynchronous. The proposed scheme eliminates storage array controllers from the replication data path and provides an implementation of array based replication which can sustain much higher input/output (I/O) write bandwidth with much lower latency from the application's perspective.

More specifically, a system is disclosed for replicating data in a network, the system comprising a primary storage array with a first array of drives, and a secondary storage array with a second array of drives, the primary storage array and the secondary storage array being coupled to each other via the network, the system comprising: a first array controller in the primary storage array receiving and processing an input/output write request from an application server; a first drive controller in the primary storage array having the first array of drives attached to it, wherein the first drive controller receives the processed input/output write request, and writes data in the first array of drives in a distributed manner with each drive of the first array of drives writing a certain portion of the data; and, a second drive controller in the secondary storage array having the second array of drives attached to it, the second drive controller receiving a mirroring signal from the first drive controller, the mirroring signal comprising the data and information about the manner of written data distribution in the first array of drives, so that data is replicated to be stored in the second array of drives mirroring the manner of written data distribution in the first array of drives.

In another aspect, a method is disclosed for replicating data in a network using a replication system, the system comprising a primary storage array with a first array of drives, and a secondary storage array with a second array of drives, the primary storage array and the secondary storage array being coupled to each other via the network, the method comprising: receiving an input/output write request at a first array controller in the primary storage array from an application server; processing the input/output write request and transferring the processed request to a first drive controller in the primary storage array, the first drive controller having the first array of drives attached to it; writing the data in the first array of drives in a distributed manner with each drive of the first array of drives writing a certain portion of the data; receiving a mirroring signal at a second array controller in the secondary storage array from the first array controller, the mirroring signal comprising the data and information about the manner of written data distribution in the first array of drives; and, replicating the data in the second array of drives attached to the second array controller, mirroring the manner of written data distribution in the first array of drives.

BRIEF DESCRIPTION OF THE DRAWINGS

These and other aspects and features of the present disclosure will become apparent to those ordinarily skilled in the art upon review of the following description of specific embodiments in conjunction with the accompanying figures, wherein.

DETAILED DESCRIPTION OF THE PREFERRED EMBODIMENTS

Figure 1:
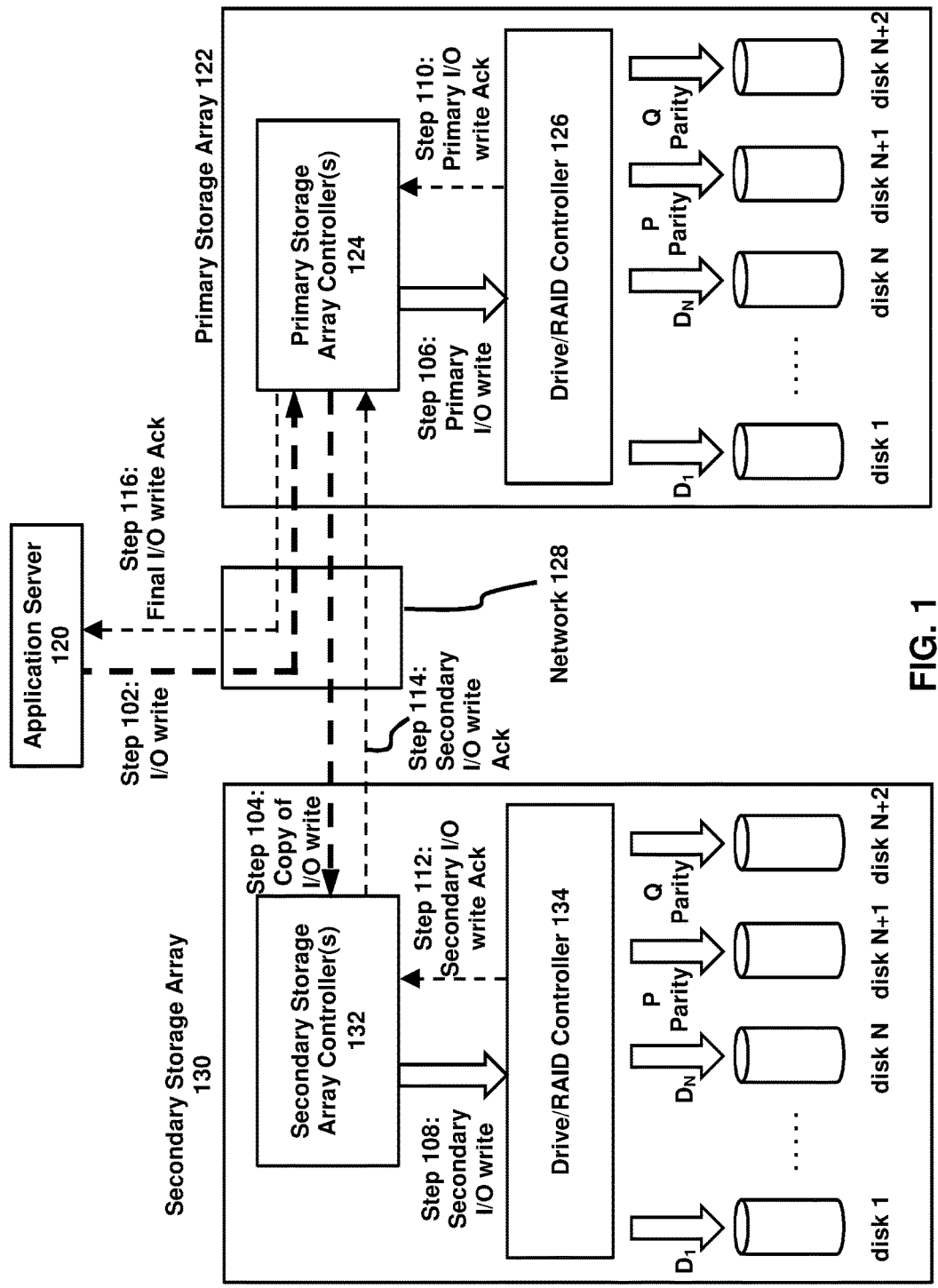
FIG. 1 illustrates a conventional synchronous replication scheme.

The embodiments will now be described in detail with reference to the drawings, which are provided as illustrative examples so as to enable those skilled in the art to practice the disclosure. Notably, the figures and examples below are not meant to limit the scope of the embodiments to a single embodiment, but other embodiments are possible by way of interchange of some or all of the described or illustrated elements. Moreover, where certain elements of the embodiments can be partially or fully implemented using known components, only those portions of such known components that are necessary for an understanding of the embodiments will be described, and detailed descriptions of other portions of such known components will be omitted so as not to obscure the disclosure.

Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the disclosure is intended to encompass other embodiments including a plurality of the same component, and vice-versa, unless explicitly stated otherwise herein.

Moreover, applicants do not intend for any term in the specification or claims to be ascribed an uncommon or special meaning unless explicitly set forth as such. Further, the present disclosure encompasses present and future known equivalents to the known components referred to herein by way of illustration.

As mentioned in the background section, synchronous replication is primarily used by applications which need instant failover. Currently available synchronous implementations like host/appliance or array based replication are very slow and not suitable for applications which have very high write bandwidth requirements. This disclosure proposes a replication scheme which removes the bottlenecks in the replication path and allows for high performance replication. Though synchronous replication is mentioned in many of the illustrative examples described in greater detail below, the disclosure is not limited to synchronous replication and can be modified to be used for asynchronous replication as well.

Note that the terms "disk" or "drive" are used in the specification to refer to a general category of storage mechanisms where data is recorded by various electronic, magnetic, optical, or mechanical changes to a surface layer of one or more disks. The disks are usually rotating disks. But alternatively, the disks may not have moving parts, such as solid state drives (SSD), where information is stored in integrated circuits. A disk drive refers to a device implementing the specific storage mechanism, enabling storing and retrieval of data. Persons skilled in the art would recognize that the scope of the disclosure is not limited by what type of storage mechanism is used. A drive controller usually controls an array of disks.

Redundant Array of Independent Disks, abbreviated as RAID, is a data storage virtualization technology that combines multiple physical disk drive components into a single logical unit for the purpose of data redundancy and performance improvement. By placing data on multiple disks, input/output (I/O) operations can overlap in a balanced way, improving performance. A RAID controller is a hardware device or software program or a combination of hardware and software used to manage disk drives in a computer or a storage array so they work as a logical unit.

Below, with reference to FIGS. 1 and 2, synchronous replication schemes are discussed to achieve failover in a network. The schemes can potentially be used for asynchronous replication as well.

Figure 2:
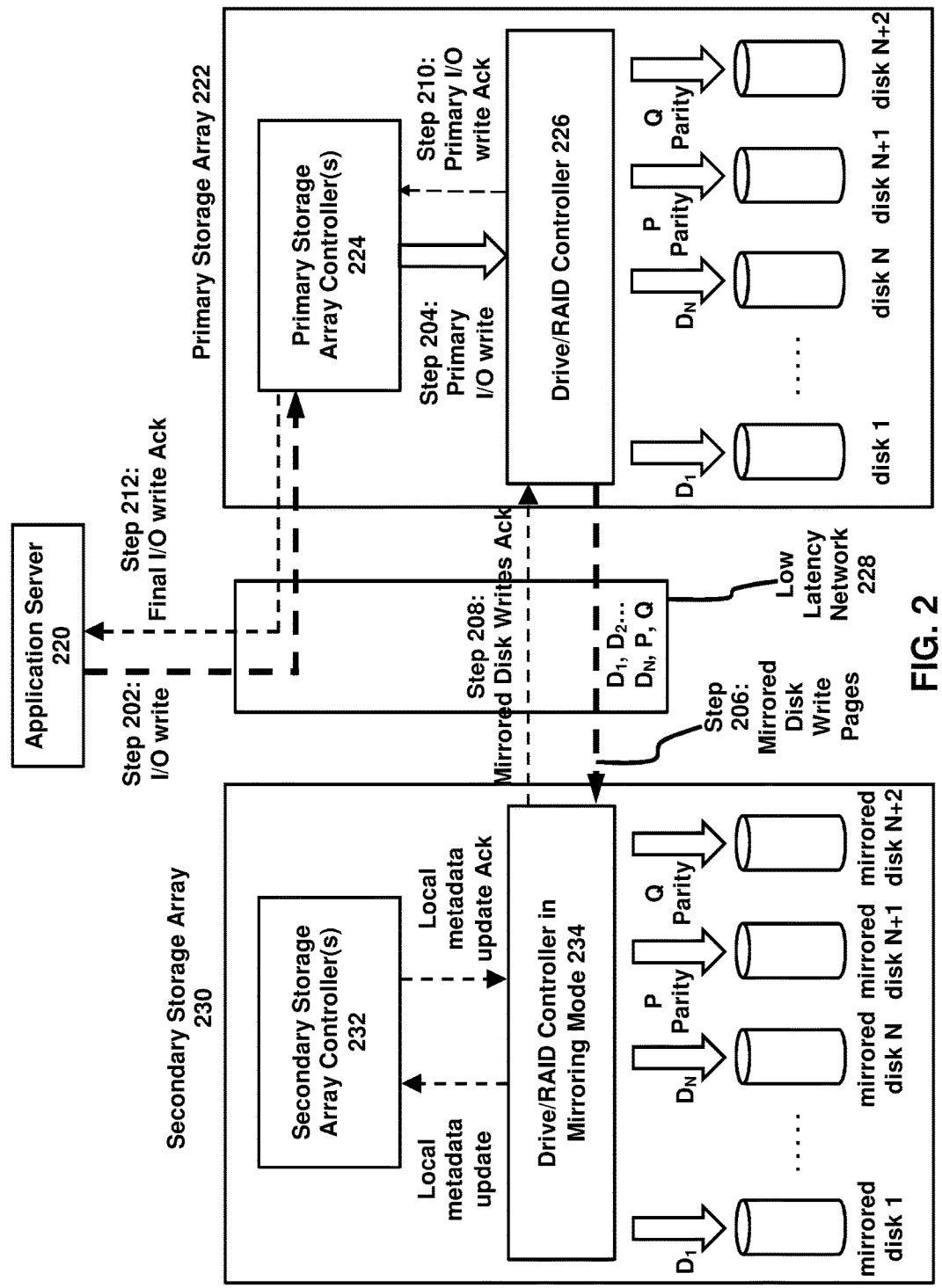
FIG. 2 illustrates an improved synchronous replication scheme according to an embodiment.

As shown in FIGS. 1 and 2, array based synchronous replication systems typically comprise at least two storage arrays: a primary storage array and one or more secondary (or stand-by) storage arrays. The application servers perform I/O operations with the primary storage array. The secondary storage array stores an exact replica of the data stored on the primary storage array and is always in sync with the primary storage array's copy of data. In case of a failure of the primary storage array, the application server fails over to using the secondary storage array.

FIG. 1 shows a conventional implementation of array based synchronous replication. The steps involved in completing an "I/O write" in a conventional replication scheme are listed below.

The application server 120 issues "I/O write" to the primary storage array 122 (step 102) via network 128. The network 128 has typical latency.

The primary storage array controller 124 forwards a copy of the "I/O write" to the secondary storage array controller 132 (step 104).

Both the primary and secondary storage arrays process the "I/O Write" independently (steps 106 and 108 respectively), and commit the write to their locally attached drives. RAID may be applied by the drive/RAID controllers 126 and 134 depending on storage mechanism.

The primary storage array 122 has local disks numbered 1 to N to store data $D_1$ to $D_N$, and possibly one or more disks for storing parity check data if RAID is enabled. In the example shown in FIG. 1, there are two disks numbered (N+1) and (N+2) for P parity and Q parity respectively. The secondary storage array 130 has disks numbered 1 to N corresponding to disks 1 to N in the primary storage array. Data $D_1$ to $D_N$ is written in the disks numbered 1 to N in the secondary storage array.

After writing is complete, the drive/RAID controllers 126 and 134 send local acknowledgement signals (labeled as "Ack" in the figures) to their respective storage array controllers 124 and 132 respectively (steps 110 and 112).

After the "I/O write" is completed at the secondary storage array 130, it sends an acknowledgement to the primary storage array 122 (step 114).

When both steps 114 and 110 are completed, the primary storage array 122 sends a final acknowledgment of the "I/O Write" back to the application server 120 (step 116).

FIG. 2 shows a synchronous embodiment of an improved replication scheme, according to an embodiment disclosed herein. It eliminates the storage array controllers from the replication data path and mirrors the primary storage's disks on the secondary storage's disks over a higher speed low latency network. The steps involved in completing an "I/O write" are listed below.

The application server 220 issues "I/O write" to the primary storage array 222 (step 202) via network 228. The network 228 is a high speed low latency network, which can be a storage area network (SAN), or other types of regular networks, such as local area network (LAN), a wide area network (WAN) etc.

The primary storage array 222 processes the "I/O Write" and forwards the "I/O Write" data to its local drive/RAID controller 226 (step 204).

The primary storage array's drive/RAID controller 226 breaks down the "I/O write" data into disk data blocks $D_1$ to $D_N$ and writes the distributed data to its locally attached drives numbered disk 1 to disk N. If RAID is enabled it writes the parity blocks (disks numbered (N+1) and (N+2)) as well to protect the RAID stripe. In addition, the drive/RAID controller 226 sends a copy of each disk data block written (i.e. $D_1$, $D_2$, . . . DN, and P, Q) over the high speed low latency network 228, to its peer drive/RAID controller 234 in the secondary storage array 230 for mirroring (step 206).

The secondary storage array's disk/RAID controller 234 is in a pass-through mode (mirroring mode). It doesn't perform any I/O or RAID processing. The secondary storage array controller 232 does not perform any I/O processing either, as it is bypassed from the data path.

The drive/RAID controller 234 writes data/parity disk data blocks received from the primary storage to its own locally attached disks that correspond to the disks in the primary storage array 222 (i.e. to identical disk and block offset as done by the primary array's disk/RAID controller 226). This process creates an exact mirror copy of the disks attached to the primary storage array 222 on the disks attached to the secondary storage array 230.

In addition to mirroring the data blocks, the secondary storage's disk/RAID controller 234 communicates with its local storage array controller 232 to update local metadata and receive acknowledgment of metadata update.

When the mirroring and metadata update steps described above are complete, the secondary storage's drive/RAID controller 234 sends an acknowledgement to the primary storage's drive/RAID controller 226 (step 208).

When the acknowledgement from the secondary storage is received (step 208) as well as the write is locally committed and acknowledged in the primary storage array (step 210), the primary storage array 222 sends the final acknowledgment of the "I/O write" back to the application server host (step 212).

Figure 3:
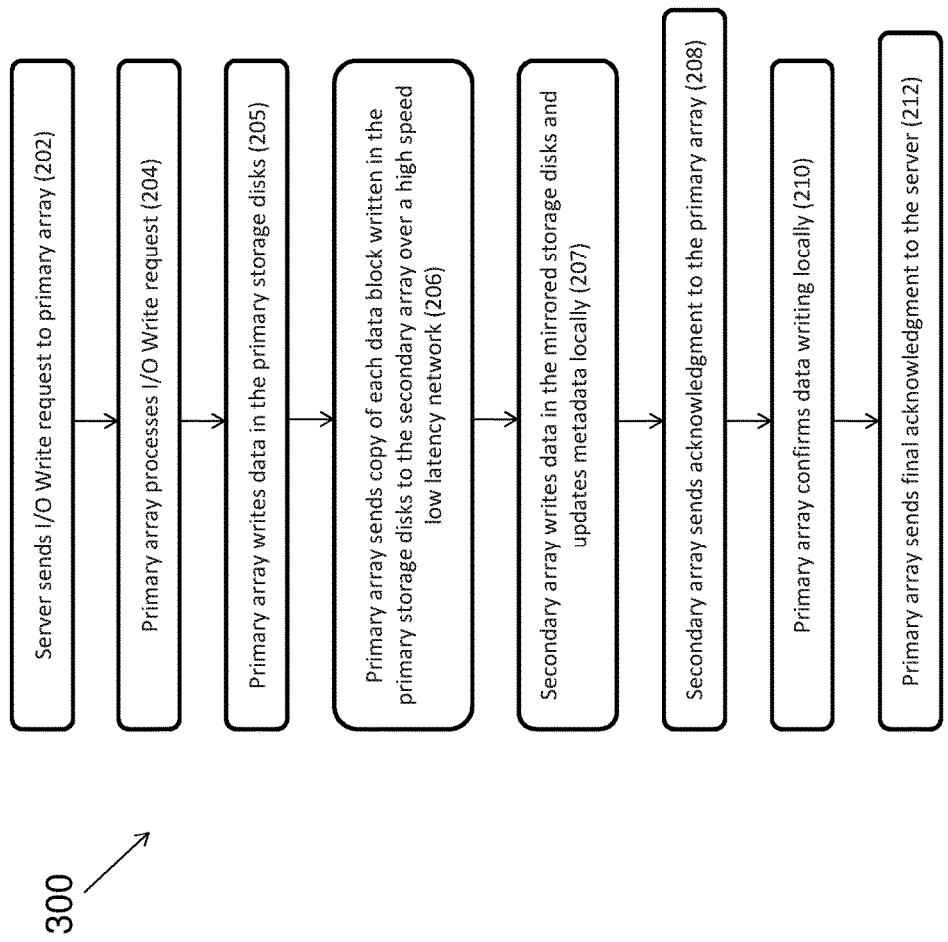
FIG. 3 illustrates example steps of the improved synchronous replication scheme.

FIG. 3 is an illustrative flowchart 300 which summarizes the main steps of the improved replication process as described in FIG. 2. Persons skilled in the art would recognize that there may be additional steps introduced to the example process flow. Similarly, some steps may be eliminated and/or replaced by alternative steps, and the sequence of the steps may change in alternative embodiments, when the replication scheme is modified within the scope of this disclosure. In the flowchart 300, the numbered steps 202, 204, 206, 208, 210 and 212 substantially match the corresponding steps shown and described in FIG. 2. Step 205 (writing data in primary storage array disks) and step 207 (writing data in secondary storage array disks) are not shown as numbered steps in FIG. 2 for clarity, though the metadata transfer sub-step in step 207 is textually labeled next to two dashed arrows between the two controllers 232 and 234 in FIG. 2.

The proposed implementation scheme described above achieves the objective of replicating data between the primary and secondary storage arrays by mirroring the primary storage disks on the secondary storage disks. Since the proposed mirroring scheme doesn't require the application I/O writes to be processed by the secondary storage array's controller(s), and the communication between the primary and secondary storage arrays happens over high speed and low latency network, minimal overhead is added. In addition, the drive/RAID controller can have a hardware based replication data path implementation, which could make this process even faster.

The proposed scheme can also be extended for asynchronous replication implementations. The mirroring process (primary to secondary) could be executed in the background with the application "I/O write" acks (step 212) not gated by the mirroring acks (step 208) from the secondary array. Since the storage controllers are not involved in the replication process, it minimizes the overhead incurred for asynchronous replication and improves the overall performance of the storage from application's perspective.

Although the present disclosure has been particularly described with reference to the preferred embodiments thereof, it should be readily apparent to those of ordinary skill in the art that changes and modifications in the form and details may be made without departing from the spirit and scope of the disclosure. It is intended that the appended claims encompass such changes and modifications.

What is claimed is:

1. A system for replicating data in a network, the system comprising a primary storage array with a first array of drives, and a secondary storage array with a second array of drives, the primary storage array and the secondary storage array being coupled to each other via the network, the system comprising:

a first array controller in the primary storage array receiving and processing an input/output write request from an application server;

a first drive controller in the primary storage array having the first array of drives attached to it, wherein the first drive controller receives the processed input/output write request, and writes data in the first array of drives in a distributed manner with each drive of the first array of drives writing a certain portion of the data; and a second drive controller in the secondary storage array having the second array of drives attached to it, the second drive controller receiving a mirroring signal from the first drive controller, the mirroring signal comprising the data and information about the manner of written data distribution in the first array of drives, so that data is replicated to be stored in the second array of drives mirroring the manner of written data distribution in the first array of drives.

2. The system of claim 1, wherein the second drive controller, though capable of performing RAID and input/output processing independently, operates in a pass-through mode, wherein the second drive controller merely distributes the data in the second array of drives in response to the mirroring signal.

3. The system of claim 1, wherein the network has low latency to effectuate drive mirroring at high speed between the primary storage array and the secondary storage array.

4. The system of claim 3, wherein the network is one of a storage area network (SAN), a local area network (LAN) or a wide area network (WAN).

5. The system of claim 1, wherein the first array of drives contains one or more drives for storing parity data needed for RAID.

6. The system of claim 5, wherein the second array of drives contain the same number of drives for storing parity data to preserve the RAID stripe in the data stored in the first array of drives, even though the second drive controller does not independently perform RAID.

7. The system of claim 1, wherein the second drive controller transmits metadata information to a second array controller in the secondary storage array.

8. The system of claim 1, wherein once the data is mirrored in the second array of drives, the second drive controller sends an acknowledgment signal to the first drive controller.

9. The system of claim 8, wherein the data replication process is synchronous.

10. The system of claim 9, the first array controller sends a final acknowledgment signal back to the application server upon receiving the acknowledgement signal from the second drive controller to the first drive controller.

11. The system of claim 8, wherein the data replication process is asynchronous.

12. The system of claim 11, wherein the first array controller sends a final acknowledgment signal back to the application server irrespective of when the acknowledgement signal from the second drive controller is received by the first drive controller.

13. A method for replicating data in a network using a replication system, the system comprising a primary storage array with a first array of drives, and a secondary storage array with a second array of drives, the primary storage array and the secondary storage array being coupled to each other via the network, the method comprising:

receiving an input/output write request at a first array controller in the primary storage array from an application server;

processing the input/output write request and transferring the processed request to a first drive controller in the primary storage array, the first drive controller having the first array of drives attached to it;

writing the data in the first array of drives in a distributed manner with each drive of the first array of drives writing a certain portion of the data;

receiving a mirroring signal at a second array controller in the secondary storage array from the first array controller, the mirroring signal comprising the data and information about the manner of written data distribution in the first array of drives; and replicating the data in the second array of drives attached to the second array controller, mirroring the manner of written data distribution in the first array of drives.

14. The method of claim 13, wherein the method further comprises:
sending an acknowledgment signal by the second drive controller to the first drive controller, once the data is mirrored in the second array of drives.

15. The method of claim 14, wherein the data replication method is synchronous.

16. The method of claim 15, wherein the method further comprises:
upon receiving the acknowledgement signal from the second drive controller, sending a final acknowledgment signal by the first array controller back to the application server.

17. The method of claim 14, wherein the data replication method is asynchronous.

18. The method of claim 17, wherein the method further comprises:
sending a final acknowledgment signal by the first array controller back to the application server irrespective of when the acknowledgement signal from the second drive controller is received by the first drive controller.

19. The method of claim 13, wherein the second drive controller, though capable of performing RAID and input/output processing independently, operates in a pass-through mode, wherein the second drive controller merely distributes data in the second array of drives mirroring the manner of written data distribution in the first array of drives.

20. The method of claim 13, wherein the network has low latency to effectuate drive mirroring at high speed between the primary storage array and the secondary storage array, wherein the network is one of a storage area network, a local area network or a wide area network.

* * * * *